(12) United States Patent
Wei et al.

(10) Patent No.: US 9,360,334 B2
(45) Date of Patent: Jun. 7, 2016

(54) SYSTEM AND METHOD FOR SETTING AN END LOCATION OF A PATH

(71) Applicant: Caterpillar Inc., Peoria, IL (US)

(72) Inventors: Mo Wei, Dunlap, IL (US); Michael Taylor, Swissvale, PA (US); Thandava K. Edara, Peoria, IL (US); Troy K. Becicka, Sahuarita, AZ (US); Kyle Edwards, Gillete, WY (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/484,720

(22) Filed: Sep. 12, 2014

(65) Prior Publication Data

US 2016/0076893 A1    Mar. 17, 2016

(51) Int. Cl.
    *G05D 1/02*       (2006.01)
    *G01C 21/34*      (2006.01)
(52) U.S. Cl.
    CPC ..................................... *G01C 21/34* (2013.01)
(58) Field of Classification Search
    USPC ........................................................ 701/410
    See application file for complete search history.

(56) References Cited

U.S. PATENT DOCUMENTS

| | | |
|---|---|---|
| 5,551,524 A | 9/1996 | Yamamoto et al. |
| 5,864,970 A | 2/1999 | Maddock et al. |
| 5,950,151 A | 9/1999 | Bernardini et al. |
| 6,167,336 A | 12/2000 | Singh et al. |
| 6,445,310 B1 | 9/2002 | Bateman et al. |
| 6,493,612 B1 | 12/2002 | Bisset et al. |
| 6,845,311 B1 | 1/2005 | Stratton et al. |
| 6,984,952 B2 | 1/2006 | Peless et al. |
| 7,079,943 B2 * | 7/2006 | Flann .................... A01B 69/008 172/4.5 |
| 7,216,033 B2 | 5/2007 | Flann et al. |
| 7,299,056 B2 * | 11/2007 | Anderson ............... G01S 19/49 455/456.1 |
| 7,299,057 B2 * | 11/2007 | Anderson ............... H04L 67/18 455/411 |
| 7,313,404 B2 * | 12/2007 | Anderson ............... G01C 21/28 455/456.1 |
| 7,578,079 B2 | 8/2009 | Furem |
| 7,607,494 B2 | 10/2009 | Alft et al. |
| 7,734,397 B2 | 6/2010 | Peterson et al. |
| 7,734,398 B2 | 6/2010 | Manneppalli |
| 7,881,497 B2 | 2/2011 | Ganguli et al. |
| 7,979,175 B2 | 7/2011 | Allard et al. |
| 8,073,584 B2 | 12/2011 | Marty et al. |
| 8,139,108 B2 | 3/2012 | Stratton et al. |
| 8,204,654 B2 * | 6/2012 | Sachs ................... A01B 79/005 700/1 |
| 8,351,684 B2 | 1/2013 | Clar et al. |

(Continued)

FOREIGN PATENT DOCUMENTS

JP        2000-137522 A      5/2000

*Primary Examiner* — Thomas Tarcza
*Assistant Examiner* — Alex C Dunn
(74) *Attorney, Agent, or Firm* — Leydig, Voit & Mayer, Ltd.; L. Glenn Waterfield

(57) ABSTRACT

A system for setting an end location of a path of operation of a machine at a work site includes a position sensor configured to determine a position of a path at the work site and a controller. The controller is configured to determine a position of a first path and a position of a second path, the first path and the second path defining a pair of paths on opposite sides of the path of operation and determine a physical characteristic of the pair of paths based upon the position of the first path and the position of the second path. The controller is further configured to determine whether the physical characteristic of the pair of paths is less than a threshold characteristic and set the end location of the path of operation if the physical characteristic of the pair of paths is less than the threshold characteristic.

18 Claims, 4 Drawing Sheets

(56) References Cited

U.S. PATENT DOCUMENTS

| | | | |
|---|---|---|---|
| 8,456,327 B2 | 6/2013 | Bechtel et al. | |
| 8,620,535 B2 | 12/2013 | Friend et al. | |
| 8,700,272 B2 | 4/2014 | Stratton et al. | |
| 8,706,363 B2 | 4/2014 | Stratton et al. | |
| 8,825,373 B1 * | 9/2014 | Martin | G01C 21/32 701/410 |
| 9,074,896 B2 * | 7/2015 | Mathews | G09B 23/10 |
| 2002/0005297 A1 | 1/2002 | Alft et al. | |
| 2003/0111268 A1 | 6/2003 | Alft et al. | |
| 2004/0158355 A1 * | 8/2004 | Holmqvist | G05D 1/0236 700/245 |
| 2004/0190374 A1 | 9/2004 | Alft et al. | |
| 2004/0207247 A1 | 10/2004 | Jackson et al. | |
| 2005/0173153 A1 | 8/2005 | Alft et al. | |
| 2005/0177292 A1 | 8/2005 | Okamura et al. | |
| 2007/0129869 A1 | 6/2007 | Gudat et al. | |
| 2007/0240903 A1 | 10/2007 | Alft et al. | |
| 2008/0180523 A1 | 7/2008 | Stratton et al. | |
| 2009/0043462 A1 | 2/2009 | Stratton et al. | |
| 2009/0090555 A1 | 4/2009 | Boone et al. | |
| 2009/0202109 A1 | 8/2009 | Clar et al. | |
| 2010/0109417 A1 | 5/2010 | Jackson et al. | |
| 2010/0250023 A1 | 9/2010 | Gudat | |
| 2011/0093171 A1 | 4/2011 | Saposnik | |
| 2012/0004816 A1 | 1/2012 | Okamura et al. | |
| 2012/0089293 A1 | 4/2012 | Halder et al. | |
| 2012/0139325 A1 | 6/2012 | Norberg et al. | |
| 2012/0154572 A1 | 6/2012 | Stratton et al. | |
| 2012/0215378 A1 | 8/2012 | Sprock et al. | |
| 2014/0012404 A1 | 1/2014 | Taylor et al. | |
| 2014/0032030 A1 | 1/2014 | Stratton et al. | |
| 2014/0032058 A1 | 1/2014 | Stratton et al. | |
| 2014/0032132 A1 | 1/2014 | Stratton et al. | |

* cited by examiner

SYSTEM AND METHOD FOR SETTING AN END LOCATION OF A PATH

TECHNICAL FIELD

This disclosure relates generally to controlling a machine and, more particularly, to a system and method for establishing an end location of a path of machine based upon adjacent paths.

BACKGROUND

Machines such as dozers, motor graders, wheel loaders, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with a work plan to perform operations including digging, loosening, carrying, etc., different materials at the work site, such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

When operating near hazardous areas such as a crest, it may be desirable to map the end location of a proposed path prior to permitting a machine to autonomously move near the hazardous area. In one example, an operator may be required to manually operate a machine to map the end location of the proposed path prior to permitting a machine to move down the path in an autonomous manner. Mapping each location along a crest may be inefficient and/or time consuming.

U.S. Pat. No. 8,706,363 discloses a control system for modifying a boundary of operation of a machine. The control system includes a crest detection system that operates to detect when the machine approaches a crest and generate a warning and/or stop the machine. In some instances, the machine may move past an existing boundary of operation along a path. Based upon various parameters, the system may extend the boundary of operation along that path.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In a first aspect, a system for setting an end location of a path of operation of a machine at a work site includes a position sensor configured to determine a position of a path at the work site and a controller. The controller is configured to store a threshold characteristic of a pair of paths on opposite sides of the path of operation and determine a position of a first path and a position of a second path, the first path and the second path defining the pair of paths on opposite sides of the path of operation. The controller is further configured to determine a physical characteristic of the pair of paths based upon the position of the first path and the position of the second path, determine whether the physical characteristic of the pair of paths is less than a threshold characteristic, and set the end location of the path of operation if the physical characteristic of the pair of paths is less than the threshold characteristic.

In another aspect, a controller implemented method of setting an end location of a path of operation of a machine at work site includes storing a threshold characteristic of a pair of paths on opposite sides of the path of operation and determining a position of a first path and a position of a second path, the first path and the second path defining the pair of paths on opposite sides of the path of operation. The method further includes determining a physical characteristic of the pair of paths based upon the position of the first path and the position of the second path, determining whether the physical characteristic of the pair of paths is less than a threshold characteristic, and setting the end location of the path of operation if the physical characteristic of the pair of paths is less than the threshold characteristic.

DETAILED DESCRIPTION

Figure 1:
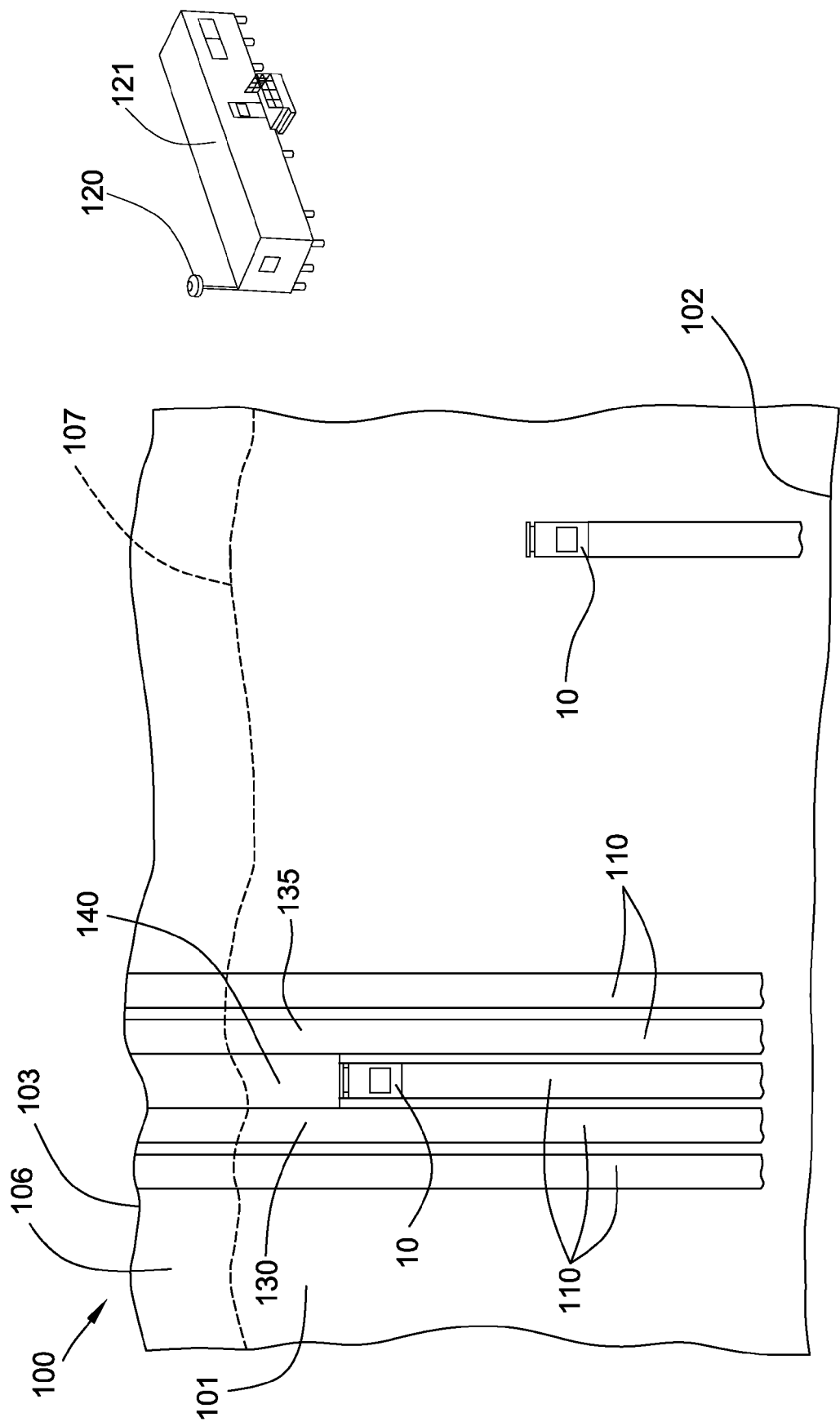
FIG. 1 depicts a schematic illustration of a work site at which a system incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

Machine 10 may be configured to move material at the work site 100 according to one or more material movement plans from an initial location such as near the high wall 102 to a spread or dump location such as at crest 103. The material movement plans may include, among other things, forming a plurality of spaced apart channels or slots 110 that are cut into the work surface 104 at work site 100 along a path generally from the high wall 102 to the crest 103. In doing so, each machine 10 may move back and forth along a linear path generally between the high wall 102 and the crest 103.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
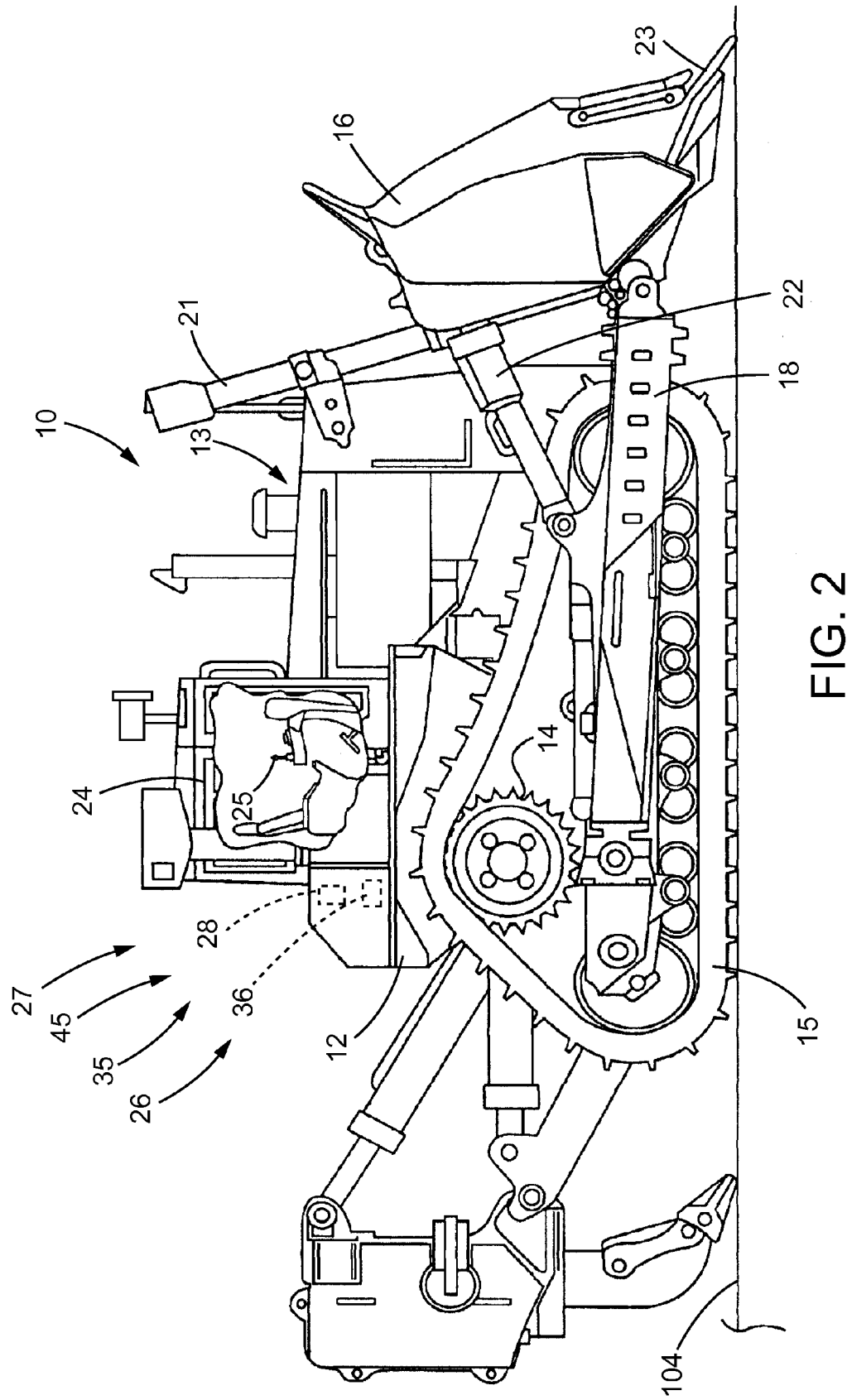
FIG. 2 depicts a diagrammatic illustration of a machine in accordance with the disclosure.

FIG. 2 depicts a diagrammatic illustration of a machine 10 such as a dozer with a ground engaging work implement such as a blade 16 configured for pushing material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used. Operation of the engine 13 and a transmission (not shown), which are operatively connected to the drive sprockets 14 and tracks 15, may be controlled by a control system 35 including a controller 36. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 120 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 121 (FIG. 1). The functionality of control system 35 may be distributed so that certain functions are performed at machine 10 and other functions are performed remotely. In such case, the control system 35 may include a communications system such as wireless communications system 120 (FIG. 1) for transmitting signals between the machine 10 and a system located remote from the machine.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position and orientation of the machine 10 are sometimes collectively referred to as the position of the machine. The position sensor 28 may include a plurality of individual sensors that cooperate to generate and provide position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some embodiments, the position sensing system 27 may include a separate orientation sensing system. In other words, a position sensing system may be provided for determining the position of the machine 10 and a separate orientation sensing system may be provided for determining the orientation of the machine.

If desired, the position sensing system 27 may also be used to determine a ground speed of machine 10. Other sensors or a dedicated ground speed sensor may alternatively be used to determine the ground speed of the machine 10.

In some situations when operating machines 10 at the work site 100 autonomously or semi-autonomously, it may be desirable to establish a controlled area or areas in which machines may only enter when operated manually (either with an operator in the cab 24 or by remote control). For example, a controlled area may be used as a buffer or crest zone 106 (FIG. 1) adjacent crest 103 to reduce the likelihood that the machines will move closer to crest 103 than desired. In such case, once reaching a boundary 107 that defines a beginning of the crest zone 106, the machine 10 may only move forward towards the crest 103 when operated manually but may operate in reverse away from the crest 103 in a manual, autonomous, or semi-autonomous manner. In another example, a controlled area may be one in which certain types of obstacles such as personnel or buildings exist. In such case, it may be desirable to require manual operation for all movement of machine 10 within the controlled area.

Machine 10 may include a crest detection system 30 shown generally by an arrow in FIG. 2 operative to detect the crest 103. In one embodiment, crest detection system 30 may be configured as an implement load monitoring system 31. The implement load monitoring system 31 may include a variety of different types of implement load sensors 32 depicted generally by an arrow in FIG. 2 to measure the load on the blade 16. As blade 16 of machine 10 moves material over the crest 103, the load on the blade will be reduced. Accordingly, the implement load sensor 32 may be utilized to measure or monitor the load on the blade 16 and a decrease in load may be registered by the controller 36 as a change in terrain due to the machine 10 being adjacent the crest 103. Thus, the controller 36 may determine a change in terrain based at least in part upon a change in the load on blade 16. It should be noted that in some instances, an increase in load on the blade 16 may also be associated with the machine being located adjacent crest 103. Other types of crest detection systems are contemplated.

Controller 36 may store therein an electronic map of the work site 100. The electronic map may be initially generated in any desired manner including by moving a mapping vehicle (not shown) about the work site 100. As machines 10 are moved about the work site 100, such as during autonomous slot dozing, the electronic map of the work site may be updated.

Over time, the stored electronic map may vary from the actual topography of the work site 100. Variations may exist due to material that has been moved without a corresponding update of the map due to shifting of the material, or otherwise. Still further, errors may occur while setting, storing, transmitting or changing the electronic map. In other words, for a variety of reasons, the electronic map of the work site 100 stored within or remotely from the controller 36 may be different from the actual physical topography of the work site 100.

Due to the adverse consequences of operating too close to a crest 103, some autonomous systems require an operator to manually operate a machine 10 to define the edge of the crest 103 before a machine may operate autonomously at the crest. In doing so, an operator may be required to operate the machine 10 along a slot 110 to manually define or set the end of the slot. Once the end of the slot 110 is defined, the machine 10 may be operated autonomously using the defined end as part of the electronic map.

Control system 35 may include a planning system 45 that operates to plan or estimate areas that do not need manual mapping through the analysis of other mapped areas and other known data. More specifically, the planning system 45 may utilize information from adjacent slots to determine an acceptable end location for a proposed slot between the adjacent slots rather than require manual mapping of the end location.

Figure 3:
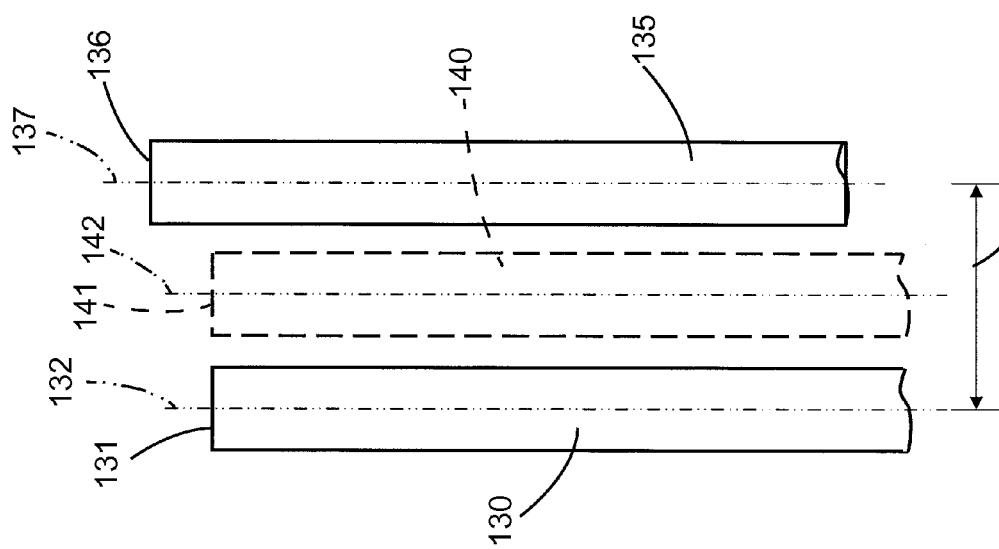
FIG. 3 depicts a schematic illustration of a portion of a plurality of slots and depicting a first end location of a proposed slot.

Referring to FIGS. 1 and 3, a first slot 130 and a second slot 135 are depicted at work site 100 and define a pair of paths or slots. The first slot 130 has an end node or location 131 generally adjacent the crest 103 and the second slot 135 has an end node or location 136 generally adjacent the crest. As depicted, the first slot 130 and the second slot 135 are generally parallel and spaced apart. If a proposed slot (depicted in phantom at 140) is to be cut in the area or path between the first slot 130 and the second slot 135, the planning system 45 may use information with respect to the first and second slots to determine whether and to what extent a machine 10 may safely travel along the path between the first and second slots.

The planning system 45 may determine whether the physical characteristics of the first slot 130 and the second slot 135 meet one or more predetermined threshold characteristics so that a safe position of an end location 141 of the proposed slot 140 may be determined or estimated. For example, the planning system 45 may determine the spacing or distance between the centerline 132 of the first slot 130 and the centerline 137 of the second slot 135. As best seen in FIG. 3, the spacing or distance 145 between the centerlines is measured along a line perpendicular to the centerlines. If the distance 145 between the centerlines is greater than a predetermined spacing threshold, the planning system 45 may determine that the first slot 130 and the second slot 135 are too far apart to estimate a safe end location 141 of the proposed slot 140 based upon the physical characteristics of the first and second slots.

In one example, the spacing threshold (e.g., the maximum spacing) may be set to approximately 12 meters when used with a blade 16 that has a width of approximately 4.5 meters. In that example, the distance of the spacing threshold is approximately 2.7 times the width of the blade 16. It is believed that, for some operating conditions, a range of acceptable spacing thresholds may be between 2.5 and 3 times the width of the blade 16. The size of the spacing threshold may be dependent upon various factors such as the type of material of the work surface 104, the type of machine 10 being operated, the size of the blade 16, and the status and confidence in any prior position data adjacent crest 103. For example, when using a smaller machine 10, it may be desirable to use a smaller threshold spacing. In instances in which the confidence in the location of crest 103 is high, there may be instances in which the spacing threshold may be increased.

In another example, the planning system 45 may determine an angle between the centerline 132 of the first slot 130 and the centerline 137 of the second slot 135. If the angle between the centerlines or angle of deviation exceeds a predetermined angle threshold, the planning system 45 may determine that a safe end location 141 of the proposed slot 140 may not be determined from the physical characteristics of the first and second slots. In one example, it may be desirable for the centerlines to be generally parallel. In another example, it may be desirable for the centerlines to diverge no more than 10 degrees. The angle of deviation, however, may depend on the lengths of the first slot 130 and the second slot 135 as well as other factors such as the type of material of the work surface 104, the type of machine being operated, and the status and confidence in any prior position data adjacent crest 103.

In addition to analyzing the physical characteristics of the first slot 130 and the second slot 135, the planning system 45 may also analyze the age of the data of the physical characteristics of the slots. In other words, the control system 35 may store a time stamp or time indicator with respect to the generation of each data point along each slot. The planning system 45 may compare the age of the data reflective of the position and the physical characteristics of the slots to a predetermined age threshold. If the age of the data is greater than the age threshold, the planning system 45 may reject the data and may not determine a safe end location 141. In other words, the end location 141 of the proposed slot 140 is only set if the time indicators for both the position of the first slot 130 and the position of the second slot 135 are less than the age threshold.

As an example, if the data with respect to the slots was recently generated, the planning system 45 may utilize the data with a relatively high degree of confidence as to its accuracy. However, over time the confidence in the accuracy of the data may decrease. Data generated within 10 minutes or less is likely to be more accurate than data that is hours or days old. This may be due to material that is moved due to environmental conditions, gravity, other machines, or any other cause that may not be reflected in the electronic map of the work site 100.

Figure 5:
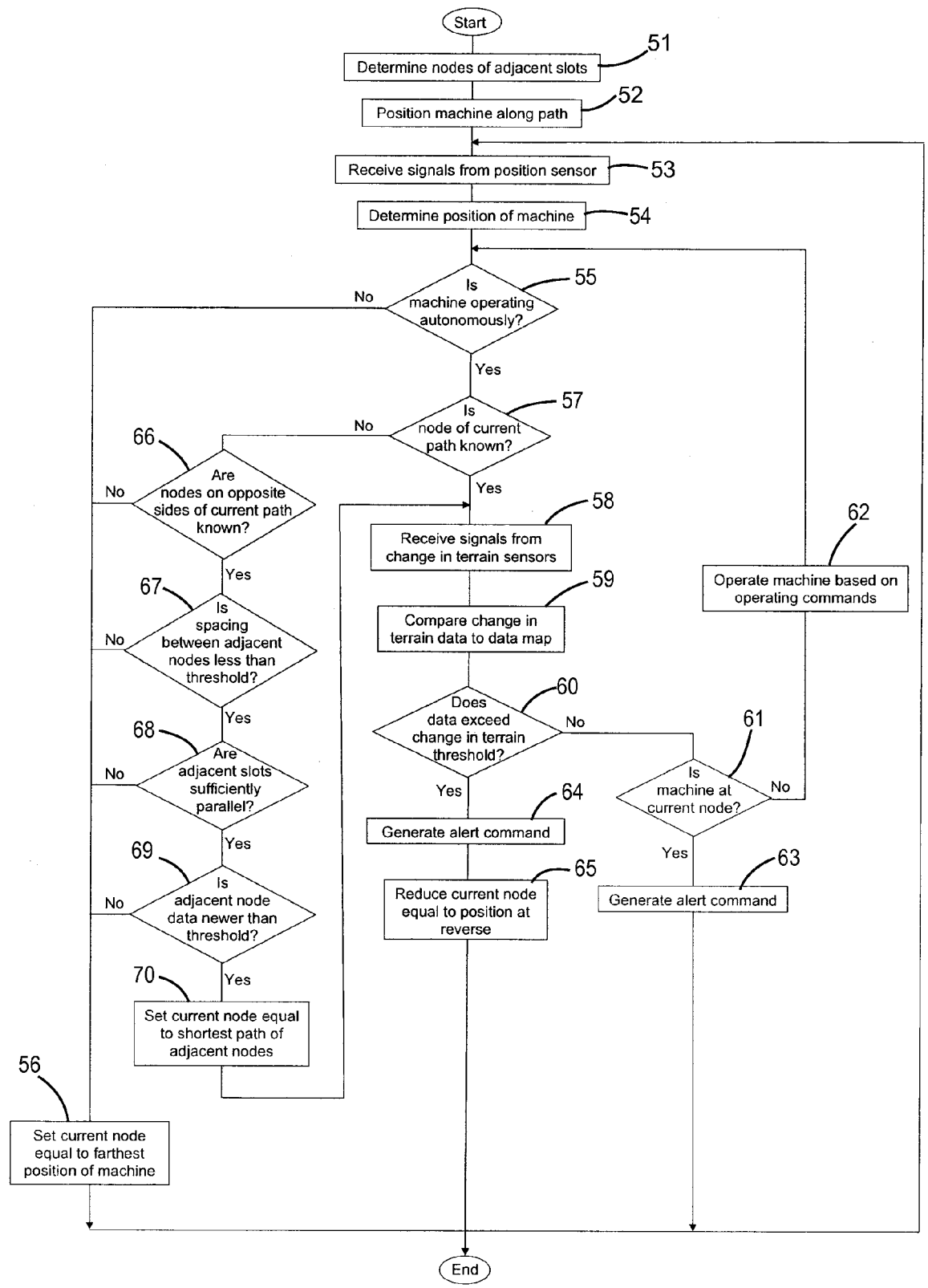
FIG. 5 depicts a flowchart illustrating a planning process in accordance with the disclosure.

Referring to FIG. 5, a flow chart depicting a boundary adjustment and planning process that may be used with a crest detection system 30 along a path of operation such as proposed slot 140 is depicted. At stage 51, the end locations or nodes of the adjacent paths of operation such as first slot 130 and second slot 135 are determined. More specifically, the end location 131 of first slot 130 and the end location 136 of second slot 135 may be determined. In one example, the end locations 131 and 136 may be determined by mapping the position of a machine 10 such as a dozer forming each of the respective slots 130 and 135. The end locations 131 and 136 may be determined or set automatically based upon the farthest position towards crest 103 (or away from high wall 102) that the machine 10 travels. In an alternate step, an operator may manually set the end locations 131 and 136 while operating a machine 10 within each slot 130 and 135 either manually or by remote control. In still another alternate step, the end locations 131 and 136 may be determined by moving a mapping vehicle (not shown) along each path of operation.

After the end locations 131 and 136 have been set, the machine 10 may be positioned and operate at stage 52 along the path at which the proposed slot 140 will be cut. The controller 36 may receive at stage 53 data in the form of position signals from the position sensor 28 indicative of the position of the machine within the work area 101. At decision stage 54, the controller 36 may determine the position of machine 10 based upon the position signals received from the position sensor 28.

At decision stage 55, the controller 36 may determine whether the machine 10 is operating autonomously (or semi-autonomously with respect to the movement or positioning of the machine). If the machine 10 is being operated or positioned by an operator using a remote control or from within the cab 24 rather than autonomously or semi-autonomously, the controller 36 may monitor the movement of machine 10 and set the end location 141 of proposed slot 140 based upon the movement of the machine. More specifically, the controller 36 may monitor the movement of the machine 10 and determine the farthest position the machine has been moved. In doing so, the controller 36 may monitor the position of a datum or reference point of the machine 10 and use the dimensions of the machine to determine the farthest position that the machine moves towards crest 103. In such case, the end location 141 may be set at stage 56 as being equal to the farthest position that a portion of the machine 10 has been moved towards the crest 103. In an alternate process step, the operator may manually set the end location 141, for example with an input device (not shown), when the machine 10 is at a desired position.

If the machine 10 is operating autonomously (or semi-autonomously with respect to the movement or positioning of the machine) at decision stage 55, the controller 36 may determine at decision stage 57 whether the end location 141 of the path or proposed slot 140 between first slot 130 and second slot 135 is known. If the end location 141 is known, the controller 36 receives at stage 58 data in the form of signals from one or more of the change in terrain sensor such as implement load sensor 32 or other sensor systems associated with crest detection system 30. The signals are indicative of a change in terrain adjacent the machine 10.

At stage 59, the controller 36 may compare the data received at stage 58 from the change in terrain sensor to a data map of the controller. At decision stage 60, the controller 36 may determine whether the data indicates that the change in terrain exceeds a change in terrain threshold.

If the crest detection system 30 does not indicate proximity to the crest 103 at decision stage 60, the controller 36 may determine through the position sensing system 27 at decision stage 61 whether the machine 10 has reached a previously determined node or end location 141 of proposed slot 140. If the machine 10 is not at the end location 141, the machine is operated at stage 62 based upon instructions or operating commands from the controller 36. If the machine 10 has reached the end location 141 of proposed slot 140 at decision stage 61, the controller 36 may generate at stage 63 an alert command, which may include a reverse command, and the machine 10 may be reversed.

If the crest detection system 30 indicates at stage 60 that the machine 10 is in proximity to the crest 103, the controller 36 may generate at stage 64 an alert command signal, which may include a reverse command signal, and the machine may be reversed. At stage 65, the controller 36 may revise or reduce the position of the end location 141. In one configuration, the end location 141 may be revised to the position of the machine 10 as determined by the position sensing system 27 at the position or location at which the controller 36 determined that the machine 10 was in proximity to crest 103.

If the end location 141 of the proposed slot 140 is not known at decision stage 57, the controller 36 may determine at decision stage 66 whether the end location 131 of the first slot 130 and the end location 136 of the second slot 135 are both known. If the end locations 131 and 136 are not both known, the controller 36 may require manual operation of the machine 10, either with an operator in cab 24 or by remote control, and the end location 141 may be set at stage 56 as described above.

If the end location 131 of the first slot 130 and the end location 136 of the second slot 135 are both known, the controller 36 may at decision stage 67 analyze the spacing or distance between the centerline 132 of the first slot 130 and the centerline 137 of the second slot 135. If the spacing between the centerlines is greater than a predetermined spacing threshold, the controller 36 may determine that the first slot 130 and the second slot 135 are too far apart to estimate a safe end location 141 of the proposed slot 140 based upon the physical characteristics of the first and second slots. In such case, the controller 36 may require manual operation of the machine 10, either with an operator in cab 24 or by remote control, and the end location 141 may be set at stage 56 as described above.

If the spacing between the centerlines is less than the spacing threshold, the controller 36 may at decision stage 68 analyze the relative orientation of the first slot 130 and the second slot 135 to determine whether the slots are sufficiently parallel to estimate a safe end location 141 of the proposed slot 140. If the relative alignment or angle of deviation between the first slot 130 and the second slot 135 is greater than a predetermined alignment threshold from parallel, the controller 36 may require manual operation of the machine 10, either with an operator in cab 24 or by remote control, and the end location 141 may be set at stage 56 as described above.

If the angle of deviation is less than the alignment threshold, the controller 36 may at decision stage 69 analyze the age of the data establishing the end location 131 of the first slot 130 and the end location 136 of the second slot 135. If the age of the data with respect to either or both of the first slot 130 and the second slot 135 exceeds a predetermined age threshold, the controller 36 may determine that the data is too old or not reliable enough to estimate a safe end location 141 of the proposed slot 140 based upon the physical characteristics of the first and second slots. In such case, the controller 36 may require manual operation of the machine 10, either with an operator in cab 24 or by remote control, and the end location 141 may be set at stage 56 as described above.

If the age of the data with respect to first slot 130 and second slot 135 is within the age threshold, the controller 36 may set or generate at stage 70 an end location 141 of proposed slot 140 based upon the end location 131 of first slot 130 and end location 136 of second slot 135. In one example depicted in FIG. 3, the controller 36 may set the end location 141 of proposed slot 140 equal to whichever end location of the first slot 130 and the second slot 135 extends the shorter distance away from the high wall 102. In other words, the end location 141 may be set to be equal to the most conservative location as between the end location 131 of first slot 130 and the end location 136 of second slot 135 and therefore the end location 141 is set to be aligned with the end location closest to the boundary 107 of crest zone 106.

Figure 4:
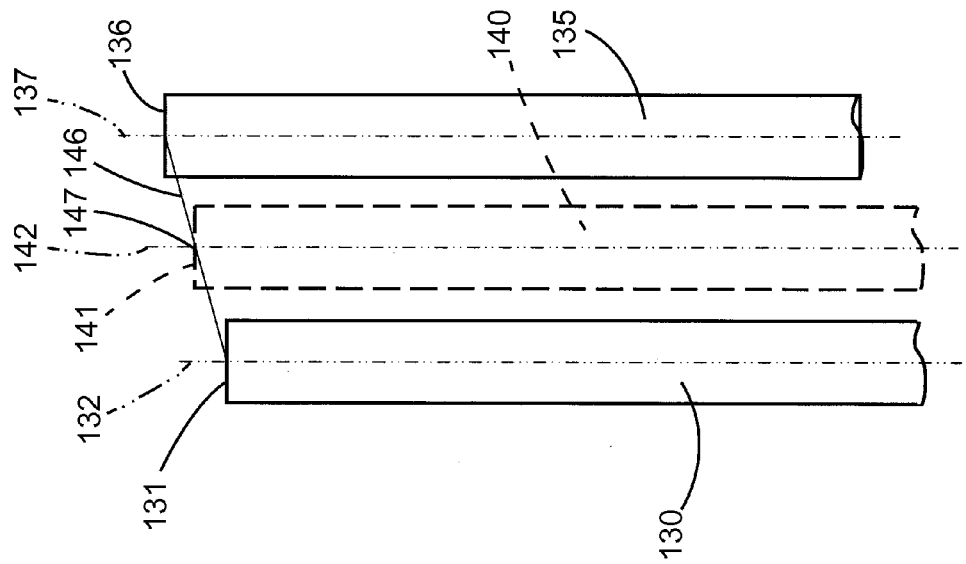
FIG. 4 depicts a schematic illustration similar to FIG. 3 but depicting an alternate end location of the proposed slot.

In another example, end location 141 of proposed slot 140 may be based upon an intersection between proposed slot 140 and a line 146 connecting end location 131 of first slot 130 and end location 136 of second slot 135. In one embodiment, the end location 141 may be set at the intersection 147 between a centerline 142 (FIG. 4) of the proposed slot 140 and line 146 connecting the centerline 132 of the first slot 130 and the centerline 137 of the second slot 135.

Other manners of setting the end location 141 are contemplated. In many instances, the end location 141 may be set so as to extend at least as far as the shorter of the first slot 130 and the second slot 131 and no farther than the longer of the first slot and the second slot. In other words, the end location may generally be positioned at a location along the path of operation 140 within the range of the end location 131 of the first slot 130 and the end location 136 of the second slot 135.

Upon setting an estimate of the end location 141 of proposed slot 140 at stage 70, the machine 10 may operate as if the end location of the proposed slot 140 were actually know at decision stage 57.

It should be noted that the end locations of the slots may be stored within the controller 36 regardless of the topography of the work site 100 for subsequent use until the data is deemed to be too old to be reliable. For example, when moving material such as by slot dozing, the slots are periodically eliminated by removing the material between the slots. As such, the topography of the work site 100 may not include any physical paths or slots but an electronic map of the work site may depict end locations (i.e., the position of the crest 103) based upon data from previous operations. Accordingly, the end location of a proposed path may be set or derived from data stored within the controller 36 regardless of the current topography of the work surface 104. In one example, even after clearing all of the slots within a work area 101, the end location 141 of a proposed slot 140 may be set or generated based upon data from the location of previously existing slots.

INDUSTRIAL APPLICABILITY

The industrial applicability of the control system 35 described herein will be readily appreciated from the foregoing discussion. The foregoing discussion is applicable to machines 10 that operate adjacent a crest 103. The machine 10 may operate in an autonomous, semi-autonomous, or manual manner to move material at a work site 100, such as a mining site, from a first position to a second position over a crest 103. As the machine 10 approaches the crest 103, it is often desirable to know the location of the crest along the path of operation or movement of the machine 10. In other words, it may be desirable to know the end location of the path of the machine 10.

For example, when a machine 10 is being operated autonomously, the operation of the machine may differ when the end location of the path is known as compared to instances in which it is unknown. In a situation in which a machine is being operated manually, it may be desirable to provide an operator with an additional safeguard to reduce the likelihood that the machine will move into an undesired or restricted area.

In some instances when the actual end location of a proposed path is unknown, it may be possible to derive or estimate the end location based upon characteristics of adjacent paths of operation such as slots formed in the work surface 104. Controller 36 may use the physical characteristics of adjacent paths along which the machine 10 or other machines have operated to determine when the adjacent paths may be used to establish or set an end location of the proposed path. For example, if the physical characteristics of the adjacent paths are within predetermined parameters or thresholds, the controller 36 may establish or set an estimate of the end location 141 of a new path such as a proposed slot 140. If the physical characteristics exceed any of the thresholds, the controller 36 may determine that it is not safe to set an end location and the machine 10 and its operator may be required to operate the machine manually.

In one example, the controller 36 may compare the distance between adjacent paths to a predetermined distance threshold. In another example, the controller 36 may compare an angle of deviation of the centerlines of the adjacent paths to a predetermined angular threshold. The controller 36 may also determine the age of any data with respect to the adjacent paths before relying upon such data to set an end location of a proposed path.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for setting an end location of a path of operation of a machine at a work site, comprising:
    a position sensor configured to determine a position of a path at the work site;
    a controller configured to:
        store a threshold characteristic of a pair of paths on opposite sides of the path of operation;
        determine a position of a first path and a position of a second path, the first path and the second path defining the pair of paths on opposite sides of the path of operation;
        determine a physical characteristic of the pair of paths based upon the position of the first path and the position of the second path;
        determine whether the physical characteristic of the pair of paths is less than a threshold characteristic;
        set the end location of the path of operation if the physical characteristic of the pair of paths is less than the threshold characteristic; and
        send a reverse command to the machine to prevent the machine from travelling past the end location;
        wherein the first path includes a first centerline and the second path includes a second centerline, and the physical characteristic is a distance between the first centerline and the second centerline.

2. The system of claim 1, wherein the distance between the first centerline and the second centerline is measured along a line perpendicular to the path.

3. The system of claim 2, wherein a work implement of the machine has a width and the distance between the first centerline and the second centerline is between 2.5 and 3 times the width.

4. The system of claim 1, wherein the first path includes a first centerline and the second path includes a second centerline, and the physical characteristic is an angle of deviation from parallel between the first centerline and the second centerline.

5. The system of claim 4, wherein the angle of deviation is 10 degrees.

6. The system of claim 1, wherein first path has a first end location, the second path has a second end location, and the end location of the path of operation is positioned at a location within a range of the end location of the first path and the end location of the second path.

7. The system of claim 6, wherein the work site includes a controlled area with a boundary defining a beginning of the controlled area and the end location of the path of operation is set to be aligned with one of the first end location and the second end location closest to the boundary.

8. The system of claim 1, wherein first path has a first end location, the second path has a second end location, and the end location of the path of operation is set based upon an intersection between the path of operation and a line connecting the first end location and the second end location.

9. The system of claim 8, wherein the first path includes a first centerline, the second path includes a second centerline, and the path of operation includes a centerline, and the end location of the path of operation is set at an intersection between a centerline of the path of operation and a line connecting the first centerline and the second centerline.

10. The system of claim 1, wherein the controller is further configured to store a second threshold characteristic and determine a second physical characteristic of the pair of paths based upon the position of the first path and the position of the second path, and set the end location of the path of operation if the second physical characteristic also is less than a second threshold characteristic.

11. The system of claim 1, wherein the controller is further configured to store an age threshold and data reflective of the position of the first path includes a first time indicator and data reflective of the position of the second path includes a second time indicator, and the end location of the path of operation is only set if the first time indicator and the second time indicator are less than the age threshold.

12. The system of claim 1, wherein the controller is further configured to store a map of the work site including the first path and the second path.

13. The system of claim 1, wherein the first path and the second path are slots formed in a work surface at the work site.

14. A controller implemented method of setting an end location of a path of operation of a machine at a work site, comprising:
    storing a threshold characteristic of a pair of paths on opposite sides of the path of operation;
    determining a position of a first path and a position of a second path, the first path and the second path defining the pair of paths on opposite sides of the path of operation;
    determining a physical characteristic of the pair of paths based upon the position of the first path and the position of the second path;
    determining whether the physical characteristic of the pair of paths is less than a threshold characteristic;
    setting the end location of the path of operation if the physical characteristic of the pair of paths is less than the threshold characteristic; and
    sending a reverse command to the machine to prevent the machine from travelling past the end location;
    wherein the first path includes a first centerline and the second path includes a second centerline, and the physical characteristic is a distance between the first centerline and the second centerline.

15. The method of claim 14, wherein the first path includes a first centerline and the second path includes a second centerline, and determining the physical characteristic includes determining an angle of deviation from parallel between the first centerline and the second centerline.

16. The method of claim 14, wherein first path has a first end location, the second path has a second end location, and setting the end location of the path of operation includes aligning the end location of the path of operation with one of the first end location and the second end location in a direction generally perpendicular to the path of operation.

17. The method of claim 14, further including storing a second threshold characteristic, determining a second physical characteristic of the pair of paths based upon the position of the first path and the position of the second path, and setting the end location of the path of operation if the second physical characteristic also is less than a second threshold characteristic.

18. The method of claim 14, further including storing an age threshold, storing a first time indicator for data reflective of the position of the first path, storing a second time indicator for data reflective of the position of the second path, and only setting the end location of the path of operation if both the first time indicator and the second time indicator are less than the age threshold.

* * * * *